(12) United States Patent
Nonaka

(10) Patent No.: US 8,719,029 B2
(45) Date of Patent: May 6, 2014

(54) FILE FORMAT, SERVER, VIEWER DEVICE FOR DIGITAL COMIC, DIGITAL COMIC GENERATION DEVICE

(71) Applicant: FUJIFILM Corporation, Tokyo (JP)

(72) Inventor: Shunichiro Nonaka, Tokyo (JP)

(73) Assignee: Fujifilm Corporation, Tokyo (JP)

( * ) Notice: Subject to any disclaimer, the term of this patent is extended or adjusted under 35 U.S.C. 154(b) by 0 days.

(21) Appl. No.: 13/923,263

(22) Filed: Jun. 20, 2013

(65) Prior Publication Data

US 2013/0282376 A1   Oct. 24, 2013

Related U.S. Application Data

(63) Continuation of application No. PCT/JP2011/076988, filed on Nov. 24, 2011.

(30) Foreign Application Priority Data

Dec. 22, 2010   (JP) ................................. 2010-286391

(51) Int. Cl.
    *G10L 13/08* (2013.01)
(52) U.S. Cl.
    USPC ............................ 704/260; 704/258; 704/270
(58) Field of Classification Search
    USPC ............ 704/1–10, 258, 260, 270, 257, 270.1; 715/706; 382/187
    See application file for complete search history.

(56) References Cited

U.S. PATENT DOCUMENTS

| 7,528,986 | B2 | 5/2009 | Kato | |
|---|---|---|---|---|
| 8,041,555 | B2 * | 10/2011 | Buccella | 704/2 |
| 8,132,100 | B2 * | 3/2012 | Seo et al. | 715/706 |
| 2002/0037104 | A1 * | 3/2002 | Myers et al. | 382/187 |

FOREIGN PATENT DOCUMENTS

| JP | 6-96288 | A | 4/1994 |
|---|---|---|---|
| JP | 2001-75581 | A | 3/2001 |
| JP | 2001-350746 | A | 12/2001 |
| JP | 2004-194002 | A | 7/2004 |
| JP | 2005-56043 | A | 3/2005 |
| JP | 2005-202062 | A | 7/2005 |
| JP | 2005-303880 | A | 10/2005 |
| JP | 2005-321706 | A | 11/2005 |

(Continued)

OTHER PUBLICATIONS

International Search Report in PCT/JP2011/076988 dated Feb. 28, 2012 with English translation thereof.

*Primary Examiner* — Huyen X. Vo
(74) *Attorney, Agent, or Firm* — McGinn IP Law Group, PLLC

(57) ABSTRACT

A viewer device for a digital comic comprising: an information acquisition unit that acquires a digital comic in a file format for a digital comic viewed on a viewer device, the file format including speech balloon information including information of a speech balloon region that indicates a region of a speech balloon, first text information indicating a dialogue within each speech balloon, the first text information being correlated with each speech balloon, and first display control information including positional information and a transition order of a anchor point so as to enable the image of the entire page to be viewed on a monitor of the viewer device in a scroll view; and a voice reproduction section that synthesizes a voice for reading the letter corresponding to the text information based on an attribute of the character, an attribute of the speech balloon or the dialogue, and outputs the voice.

23 Claims, 14 Drawing Sheets

(56) References Cited

FOREIGN PATENT DOCUMENTS

| | | |
|---|---|---|
| JP | 2006-185435 A | 7/2006 |
| JP | 2007-37057 A | 2/2007 |
| JP | 2007-102360 A | 4/2007 |
| JP | 2007-164550 A | 6/2007 |
| JP | 2007-226255 A | 9/2007 |
| JP | 2007-241942 A | 9/2007 |
| JP | 2008-51872 A | 3/2008 |
| JP | 2008-170544 A | 7/2008 |
| JP | 2010-68044 A | 3/2010 |
| JP | 2010-135925 A | 6/2010 |
| WO | WO 2007/069343 A1 | 6/2007 |

\* cited by examiner

FIG.2

| HEADER |
|---|
| IMAGE (IN PAGE UNITS OR PANEL UNITS) |
| ACCOMPANYING INFORMATION<br><br>•SEARCH INFORMATION (PAGE, PANEL NUMBER, WHICH EPISODE, TITLE, AUTHOR, PUBLISHER, SEARCH TAG, ETC.)<br><br>•SPEECH BALLOON INFORMATION (SPEECH BALLOON REGION, POSITION OF SPEECH BALLOON POINTER, TYPE OF SPEECH BALLOON LINE, ETC.)<br><br>•TEXT INFORMATION (DIALOGUE IN SPEECH BALLOON (ORIGINAL TEXT, TRANSLATED TEXT), FONT, POINT SIZE, ONOMATOPOEIA, ETC.)<br><br>•CHARACTER INFORMATION (ATTRIBUTE OF EACH CHARACTER (SEX, AGE, ETC.), EXISTENCE REGION OF EACH CHARACTER, ETC.)<br><br>•DISPLAY CONTROL INFORMATION (ANCHOR POINT, PANEL COORDINATE, REPRODUCTION ORDER, REPRODUCTION SCENARIO, ETC.)<br><br>•ATTRIBUTE INFORMATION OF AUTOMATIC READING ALOUD (READING SPEED, SOUND VOLUME, EMOTION INFORMATION, ETC.)<br><br>•REPRODUCTION EFFECT INFORMATION (TERMINAL VIBRATION, SCREEN SHAKING, SCREEN FLASHING, ETC.)<br><br>•OTHER (PAGE TURNING METHOD, LINE FEED DIRECTION, CHANGEABILITY OF PAGE LAYOUT, ADVERTISING DATA, ETC.) |

FIG.10

[PAGE n]

| ANCHOR POINT | DIALOGUE ORDER | TEXT INFORMATION (IN SPEECH BALLOON) | ATTRIBUTE INFORMATION OF CHARACTER | ATTRIBUTE INFORMATION OF AUTOMATIC READING ALOUD | ONOMATOPOEIA |
|---|---|---|---|---|---|
| 1 | | | | | |
| 2 | | | | | |
| 3 | 1 | "An assistant has been ready for this situation." | SEX: FEMALE AGE: 20 | READING SPEED: HIGH SOUND VOLUME: MEDIUM | |
|  | 2 | "You're great. Ritusko." | CHILD | READING SPEED: MEDIUM SOUND VOLUME: MEDIUM | |
|  | 3 | "peep" | LITTLE BIRD | READING SPEED: MEDIUM SOUND VOLUME: LOW | |
|  | 4 | "Greeeaaat!!" | CHILD | READING SPEED: LOW SOUND VOLUME: HIGH | "Wow" OCCURRENCE TIMING: T₁ REPEAT COUNT: 3 |
| 4 | | | | | |
| 5 | | | | | |
| 6 | | | | | |
| 7 | | | | | |

FIG.12

FIG.13
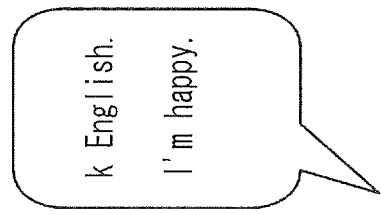
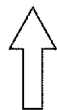
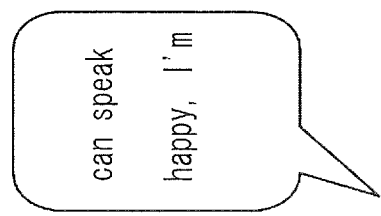
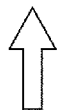
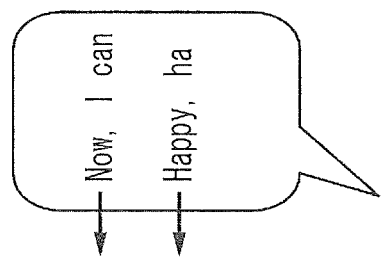

US 8,719,029 B2

FILE FORMAT, SERVER, VIEWER DEVICE FOR DIGITAL COMIC, DIGITAL COMIC GENERATION DEVICE

CROSS-REFERENCE TO RELATED APPLICATIONS

This application is a continuation application and claims the priority benefit under 35 U.S.C. §120 of PCT Application No. PCT/JP2011/076988 filed on Nov. 24, 2011 which application designates the U.S., and also claims the priority benefit under 35 U.S.C. §119 of Japanese Patent Application No. 2010-286391 filed on Dec. 22, 2010, which applications are all hereby incorporated by reference in their entireties.

TECHNICAL FIELD

The present invention relates to a file format for digitizing a comic content.

BACKGROUND ART

Along with recent innovations in information technology, an information delivery system in which books, such as magazines and comic books, supposed to be printed on paper are digitized, and viewed on a dedicated digital book viewer such as iPad and Kindle has been established.

According to Patent Literature 1, a bound comic book is written in a predetermined language B other than Japanese and, in an embodiment, written in English.

According to Patent Literature 2, a vertically-written document is determined to be opened from left as a page order.

According to Patent Literature 3, when an original text is written vertically and a translated text is written horizontally, layout information is rotated to convert a layout to a horizontal layout.

According to Patent Literature 4, a ticker display speed is set based on a display size, a font size, a letter direction, or the like.

According to Patent Literature 5, panel features are converted into scores, and effects such as zooming and panning are applied according to the scores.

According to Patent Literature 6, a basic master name, a dialogue layer name, a dialogue paragraph style name, a panel number layer name, a panel number paragraph style name, a sketch layer name, a ruby line spacing amount, a text direction, and a scale factor are determined based on an environment file.

Patent Literature 7 refers to a block (corresponding to a speech balloon), a text attribute, and an anchor (page switching).

According to Patent Literature 8, music content information relevant to biographic information is extracted to play music.

According to Patent Literature 9, an event (voice reproduction operation, vibration, etc.) is generated with respect to a comic. For example, a sound effect is set to a high, loud, and long tone when there is a scream, etc.

According to Patent Literature 10, a text in a touched portion is output as a voice.

According to Patent Literature 11, different character's voices are reproduced in different tones, or in a user's favorite tone. The voice is reproduced in synchronization with image display. A presently-reproduced voice portion is displayed in a different color.

According to Patent Literature 12, letters in a speech balloon are converted into a voice. Since the mouth of a speaker outputting the voice is moved, a relationship between a character and the speech balloon is clearly indicated.

CITATION LIST

Patent Literature

PTL 1 Japanese Patent Application Laid-Open No. 2008-51872
PTL 2 Japanese Patent Application Laid-Open No. 2005-303880
PTL 3 Japanese Patent Application Laid-Open No. 06-96288
PTL 4 Japanese Patent Application Laid-Open No. 2008-170544
PTL 5 Japanese Patent Application Laid-Open No. 2007-037057
PTL 6 Japanese Patent Application Laid-Open No. 2006-185435
PTL 7 Japanese Patent Application Laid-Open No. 2005-056043
PTL 8 Japanese Patent Application Laid-Open No. 2010-068044
PTL 9 Japanese Patent Application Laid-Open No. 2007-241942
PTL 10 Japanese Patent Application Laid-Open No. 2007-102360
PTL 11 Japanese Patent Application Laid-Open No. 2005-321706
PTL 12 Japanese Patent Application Laid-Open No. 2004-194002

SUMMARY OF INVENTION

Technical Problem

There is a demand for changing a method of reproducing a digital comic based on the specifications of each terminal. For example, an entire page of a digital comic may not be displayed in a mobile phone with a small display screen. Thus, the terminal itself preferably determines how to display a portion of the page. However, the conventional techniques do not refer to what kind of information is required for the determination.

The present invention provides a file format which enables a letter string of a dialogue in an original language, and a letter string of a dialogue converted into any language from the dialogue in the original language to be properly arranged within a speech balloon region.

Solution to Problem

The present invention provides a file format for a digital comic viewed on a viewer device, the file format including: a high-definition image of an entire page for each page of a comic; speech balloon information including information of a speech balloon region that indicates a region of a speech balloon in which a dialogue of a character of the comic is placed within the image; first text information indicating a dialogue within each speech balloon, the first text information being correlated with each speech balloon; and first display control information including positional information and a transition order of a predetermined anchor point so as to enable the image of the entire page to be viewed on a monitor of the viewer device in a scroll view.

The present invention provides a file format for a digital comic viewed on a viewer device, the file format including: a panel image of each panel of a comic; speech balloon information including information of a speech balloon region that indicates a region of a speech balloon in which a dialogue of a character of the comic is placed within the panel image; first text information indicating a dialogue within each speech balloon, the first text information being correlated with each speech balloon; and second display control information including a reproduction order of respective panel images and an image size of the panel image so as to enable the panel image to be viewed on a monitor of the viewer device in a panel view.

The present invention provides a file format for a digital comic viewed on a viewer device, the file format including: a high-definition image of an entire page for each page of a comic; speech balloon information including information of a speech balloon region that indicates a region of a speech balloon in which a dialogue of a character of the comic is placed within the image; first text information indicating a dialogue within each speech balloon, the first text information being correlated with each speech balloon; first display control information including positional information and a transition order of a predetermined anchor point so as to enable the image of the entire page to be viewed on a monitor of the viewer device in a scroll view; and second display control information including panel region information that indicates a region of each panel image within the image of the entire page, a reproduction order of respective panel images, and an image size of the panel image so as to enable the panel image of each panel within the image of the entire page to be viewed on the monitor of the viewer device in a panel view.

The speech balloon information includes at least one of positional information of a speech balloon pointer, and a type of a speech balloon line.

The file format includes existence region information indicating a region of a character within the image of the entire page.

The file format includes existence region information indicating a region of a character within the panel image.

The file format includes second text information indicating an onomatopoeia or a letter in a region other than the speech balloon region, the second text information being correlated with each panel.

The first text information includes a translated text obtained by translating the dialogue in an original text within the speech balloon into a predetermined language.

The second text information includes a translated text obtained by translating the onomatopoeia or the letter in an original text in the region other than the speech balloon region into a predetermined language.

The file format includes information regarding a language of the translated text. Here, the information regarding a language includes the type of language, a reading direction in a case of horizontal writing, vertical writing, horizontal writing, or the like.

The first text information includes an attribute of a character for the dialogue within each speech balloon. Here the attribute of a character includes a sex, an age, or the like.

The first text information includes attribute information of a letter of the dialogue within each speech balloon. Here, the attribute information of a letter includes a font, a point size, letter spacing, line spacing, and an emphasized letter.

The first text information includes first accompanying information of at least one of a volume and a reading speed of a voice for the dialogue within each speech balloon.

The second text information includes attribute information of the onomatopoeia or the letter in the region other than the speech balloon region.

The second text information includes second accompanying information of at least one of the number of phonations of the onomatopoeia, a phonation starting time, a volume, and a reading speed of the onomatopoeia or the letter.

The first display control information includes a scenario of screen transition including a stopping time at each anchor point in the scroll view.

The second display control information includes a scenario of screen transition including a stopping time at each panel image in the panel view.

The file format includes tag information including a comic title, which episode, which volume, an author, and a publisher.

The present invention includes a server delivering a digital comic in the file format described above according to a request from a viewer device.

The present invention includes a viewer device for a digital comic including: a display unit; an information acquisition unit that acquires a digital comic in the file format described above; an image display control unit that scroll-reproduces or panel-reproduces the image of each page or each panel on a screen of the display unit based on display control information of the acquired digital comic; and a letter display control unit that displays a letter corresponding to text information of the acquired digital comic instead of an original letter within a speech balloon region in the image displayed on the screen of the display unit based on speech balloon information and the text information of the acquired digital comic.

The present invention includes a digital comic generation device including: an image acquisition unit that acquires a high-definition image of an entire page for each page of a comic; a page information analysis unit that analyzes the acquired image, and thereby acquires speech balloon information including information of a speech balloon region that indicates a region of a speech balloon in which a dialogue of a character of the comic is placed within the image, first text information indicating a dialogue within each speech balloon, the first text information being correlated with each speech balloon, and first display control information including positional information and a transition order of a predetermined anchor point so as to enable the image of the entire page to be viewed on a monitor of a viewer device in a scroll view; and a digital comic generation unit that generates a digital comic in a file format including the high-definition image of the entire page acquired by the image acquisition unit, and the speech balloon information, the first text information, and the first display control information acquired by the page information analysis unit.

The present invention includes a digital comic generation device including: an image acquisition unit that acquires a high-definition image of an entire page for each page of a comic; a page information analysis unit that analyzes the acquired image, and thereby acquires panel region information indicating a region of a panel image of each panel within the image of the entire page, speech balloon information including information of a speech balloon region that indicates a region of a speech balloon in which a dialogue of a character of the comic is placed within the panel image, first text information indicating a dialogue within each speech balloon, the first text information being correlated with each speech balloon, and second display control information including a reproduction order of respective panel images and an image size of the panel image so as to enable the panel image to be viewed on a monitor of a viewer device in a panel view; a panel image generation unit that generates a panel image by clipping a panel image from the high-definition image based on the panel region information acquired by the page information analysis unit; and a digital comic generation unit that generates a digital comic in a file format including the panel image generated by the panel image generation unit, and the speech balloon information, the first text information, and the second display control information acquired by the page information analysis unit.

The present invention includes a digital comic generation device including: an image acquisition unit that acquires a high-definition image of an entire page for each page of a comic; a page information analysis unit that analyzes the acquired image, and thereby acquires panel region information indicating a region of a panel image of each panel within the image of the entire page, speech balloon information including information of a speech balloon region that indicates a region of a speech balloon in which a dialogue of a character of the comic is placed within the image, first text information indicating a dialogue within each speech balloon, the first text information being correlated with each speech balloon, first display control information including positional information and a transition order of a predetermined anchor point so as to enable the image of the entire page to be viewed on a monitor of a viewer device in a scroll view, and second display control information including a reproduction order of respective panel images and an image size of the panel image so as to enable the panel image to be viewed on the monitor of the viewer device in a panel view; and a digital comic generation unit that generates a digital comic in a file format including the high-definition image of the entire page acquired by the image acquisition unit, and the panel region information, the speech balloon information, the first text information, the first display control information, and the second display control information acquired by the page information analysis unit.

Advantageous Effects of Invention

In accordance with the present invention, the viewer device can display the first text information indicating the dialogue within each speech balloon based on the information of the speech balloon region of the file format in both the scroll view and the panel view, and can properly arrange the letter string of the dialogue in an original language, and the letter string of the dialogue converted into any language from the dialogue in the original language within the speech balloon region.

BRIEF DESCRIPTION OF DRAWINGS

FIG. 2 is a concept explanatory view of a content file.

FIG. 10 is a view illustrating one example of information regarding voice reproduction corresponding to a displayed detailed image.

FIG. 12 is a view illustrating another example (spiral scrolling) of display of text information in a speech balloon.

FIG. 13 is a view illustrating another example (scrolling of a plurality of lines) of display of text information in a speech balloon.

DESCRIPTION OF EMBODIMENTS

First Embodiment

Figure 1:
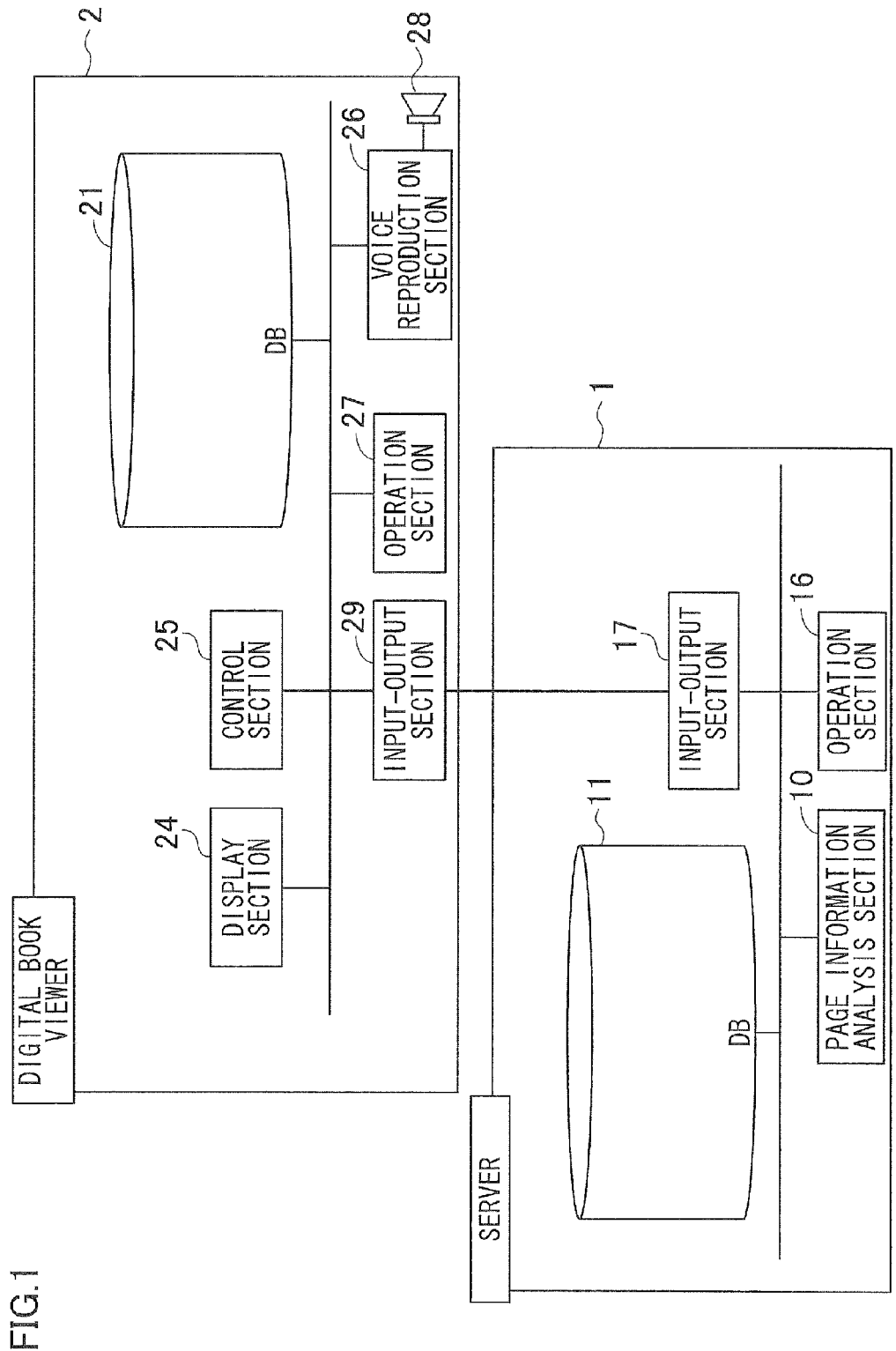
FIG. 1 is a schematic configuration diagram of a content reproduction system.

FIG. 1 shows a configuration of a content delivery system according to a preferred embodiment of the present invention. The system includes a server 1 and a digital book viewer 2. The server 1 is composed of a computer (information processor) including an arithmetic device (CPU), a memory device that stores programs and data required for operating the arithmetic device, an input-output circuit, or the like.

The digital book viewer 2 is an information terminal including a display unit capable of reproducing an image, a communication unit, an arithmetic device (CPU), a memory device, an input-output circuit, an operation unit, a voice reproduction unit capable of reproducing a voice, or the like, and is composed of, for example, a smartphone or a tablet computer. An unspecified large number of digital book viewers 2 may access the server 1.

To be more specific, the server 1 includes a page information analysis section 10, a database (DB) 11, an operation section 16, and an input-output section 17.

The page information analysis section 10 is composed of an information processor such as a CPU. The DB 11 is composed of a memory medium such as a hard disk and a memory. The operation section 16 is an operation unit such as a keyboard, a mouse, and a touch pad.

The DB 11 accumulates content files that store content images correlated with page numbers and their accompanying information in a predetermined file format. The content image is obtained by digitizing an original content by a scanner or the like. The original content, such as comics, newspapers, articles in weekly magazines, office documents (presentation documents, etc.), textbooks, and reference books, is set in units of pages. The original content image is also correlated with the page number.

The content image and its accompanying information may be saved in any format, and are saved in an XML file or the like. The accompanying information may be recorded on the original content image. The accompanying information may include a content author, a title, the total number of pages, a volume number, an episode number, the holder of the right of publication (a publisher), or the like.

The content image includes a schematic image, and a detailed image (high-definition data), which are respectively prepared for each page, panel, or anchor point.

The accompanying information accompanying the content image includes information input from the operation section 16, information on an analysis result by the page information analysis section 10, or information input via the input-output section 17.

FIG. 2 is a concept explanatory view of the content file. The content file includes both of a content file for a scroll view including a schematic image for each page and a detailed image corresponding to each anchor point in the page, and a content file for a panel view including a schematic image for each page, and a detailed image for each panel. Although the digital comic information is composed of one file in the present embodiment, the digital comic information may be composed of a plurality of files by storing the content image and the accompanying information in separate files.

A header indicates a file attribute (file name, etc.).

The accompanying information is composed of search tag information, speech balloon information, text information, character information, display control information, attribute information of automatic reading aloud, reproduction effect information, page information, and other information.

Search tag information: The search tag information is tag information used for searching. Examples thereof may include information such as a page number (page identification information), a panel number (panel identification information), an episode number (episode identification information indicating, for example, which episode), a title, an author, a publisher (the holder of the right of publication), and the total number of pages.

Speech balloon information: The speech balloon information is information regarding a speech balloon in the content image in units of pages (or in units of panels). Examples thereof include speech balloon region information indicating an existence region of a speech balloon within the content image, the shape of the speech balloon, the position and direction of a starting point of the speech balloon (a pointer of the speech balloon), a line attribute (dotted line, solid line, etc.) of the speech balloon, a relative positional relationship between an element (speaker, etc.) of the content image and the starting point of the speech balloon (e.g., a minimum interval between the pointer of the speech balloon and a speaker's face indicated by the pointer of the speech balloon), the size of the speech balloon, identification information of a speaker of the speech balloon, and a panel to which the speech balloon belongs. The speech balloon region information is, for example, information indicating the position of a line (frame line) of the speech balloon within the content image (e.g., positional information of a plurality of points on the line corresponding to the shape of the speech balloon, or vector information of the entire line). The speech balloon region information may be bitmap information indicating an entire region (range) of the speech balloon. The speech balloon region information may be also represented by a specific position (center position) of the speech balloon and the size of the speech balloon. For example, when there are four types of speech balloons as shown in FIGS. 3A to 3D, identification information A to D respectively corresponding to the speech balloons are stored as the line attributes of the speech balloons.

Text information: The text information is information regarding a text within the content image. Examples thereof include a text (sentence), letter attribute information, the number of lines, line spacing, letter spacing, a display switching method, a used language, and discrimination of vertical writing/horizontal writing or a reading direction corresponding to each panel and each speech balloon. The letter attribute information includes a letter size (point size, etc.) and a letter class (font, emphasized letter, etc.). A dialogue of a speaker in a speech balloon is included in the text information. A translated text in various languages and its used language (the translated text may be translated into two or more languages) corresponding to a dialogue in an original text arranged within a speech balloon may be also included in the text information. A text arranged outside of a speech balloon (narration, letter string indicating an onomatopoeia, etc.), a translated text thereof and an attribute of the text (letter size, font, text decoration, etc.), and reading-aloud attributes thereof (volume, speed, repeat count, start/end timings, etc.) may be further included in the text information. The display switching method may include a scrolling speed, a scrolling direction, and a scrolling method such as a method for starting, ending, suspending, and repeating scrolling.

Character information: The character information is information regarding a speaker of a dialogue in a speech balloon. Examples thereof include speaker region information (face region information, etc.) indicating an existence region of a speaker (character) within the content image (the schematic image and the detailed image), identification information of the speaker (name, etc.), and an attribute of the speaker (sex, age, etc.). The speaker unit a generation source of a dialogue (speech) in a speech balloon, and includes not only humans, but also animals, and inanimate objects such as phones, personal computers, electronic devices, and robots.

The display control information is information regarding display control in units of pages or in units of panels.

Display control information for a scroll view, which enables an image of an entire page to be viewed by moving (scrolling) the image from a present anchor point to a next anchor point and stopping the image at each anchor point for a desired length of time (a preset stay time or a time until scrolling to the next anchor point is manually instructed), includes positional information (coordinates) of each anchor point on the image of the entire page, a transition order of respective anchor points, a stay time, or the like.

Display control information for a panel view, which enables a panel image to be viewed by clipping a panel image from an image of an entire page according to a panel order and stopping the clipped panel image for a desired length of time (a preset stay time or a time until next panel feeding is manually instructed), includes panel region information indicating a region of each panel image within the image of the entire page, a reproduction order of respective panel images, an image size of the panel image, a stay time, or the like.

The panel region information includes (1) information in which a "panel" is represented by a polygonal shape and thereby represented by positional information (coordinates) of all the vertices of the polygonal shape on the image of the entire page, and (2) information in which a "panel" is represented by a mask image (a binary image in which a panel region is 1 and a region other than the panel is 0). An item (data item regarding a panel) that enables a hierarchical expression indicating as if a panel exists within a panel (e.g., "a panel in the panel", "a panel to which the panel belongs") may be also added independently of the above (1) and (2). In the case of a panel view which enables a panel image to be viewed by directly acquiring a panel image clipped from the image of the entire page according to the panel order and stopping the acquired panel image for a desired length of time, the panel region information (information for clipping the panel image from the image of the entire page) out of the display control information described above becomes unnecessary.

The display control information also includes screen scrolling and/or screen switching. The screen scrolling information may include a scrolling speed, a scrolling direction, a scrolling order, and a method for starting, ending, suspending, and repeating scrolling as detailed information. The screen switching information may include a unit of switching (panel, etc.), a method for determining a switching timing (manual, automatic, semiautomatic), and a display effect (wiping, fading in/fading out, dissolving) accompanying switching as detailed information.

Attribute information of automatic reading aloud: Examples thereof include a reading speed, a sound volume, and speaker's emotion.

The display control information includes a reproduction scenario. The reproduction scenario includes an enlargement factor of a detailed image as a unit of a partial display region of the content image, a display switching speed and a display switching method (scrolling, fading out/fading in, etc.) from a detailed image corresponding to a previous anchor point to a detailed image corresponding to a next anchor point, a stay time as a gaze stopping time length at each anchor point or each panel, that is, a display time length of a detailed image corresponding to each anchor point, ranks (page, section) of a schematic image and a detailed image in the content, a transition order of anchor points, header information, or the like. The anchor point unit a position (eye stop) at which gaze stops within a partial region of an image of each page (typically, a panel or a portion of a panel).

The reproduction scenario includes a stay time suitable for a text amount in the detailed image corresponding to each anchor point. When there is a larger text amount in the detailed image around each anchor point, there is correspondingly a larger amount of information in one screen. Thus, the stay time is correspondingly set to be longer in the reproduction scenario.

Alternatively, the enlargement factor of the detailed image at each anchor point is set in the digital book viewer 2 accessing the server 1, or a stay time for each model suitable for the screen size of each model is set in the reproduction scenario.

Alternatively, the display switching speed between the anchor points is set in the reproduction scenario. The speed may be determined based on a past viewing speed acquired as reproduction state information corresponding to a user of the digital book viewer 2 accessing the server 1, or may be determined by applying past viewing speeds acquired as reproduction state information from a plurality of digital book viewers 2 reproducing the same reproduction content to a predetermined arithmetic expression (average, etc.).

The display switching method may be determined according to an instruction from a user of the digital book viewer 2 to an operation section 27, may employ a predetermined default switching method, or may be set based on content analysis information. For example, when the gaze of a character in the content within a panel a is directed toward a panel b to which the anchor point is moved, the display switching method from the panel a to the panel b is set to scrolling.

Information regarding a reading voice: Examples thereof include a content of a reading voice, start/end timings, a reading speed, a reading voice volume, and an attribute of a reading speaker (sex, age, etc.). The content of the reading voice may be a recorded voice, or an artificial voice. When the content of the reading voice is an artificial voice, the content can be shared with a content of a speech balloon and/or an accompanying voice.

Page information: Examples thereof include opening from left/opening from right, and a line feed direction (in a case of vertical writing).

Information regarding an accompanying voice: Examples thereof include a content of an onomatopoeia or a sound effect (text information of an original text and a translated text), the number of appearances, an appearance panel, a volume, a start timing/end timing, a speed, and a sound volume. The onomatopoeia may be acquired from the content image by the page information analysis section 10, or may be input from the input-output section 17 or the like. For example, letter information not included in a speech balloon is acquired as the content of the onomatopoeia. A translated text in various languages corresponding to the onomatopoeia may be also included in the information.

Information regarding a reproduction effect: Examples thereof include the type and start timing of an effect such as terminal vibration, screen shaking, screen flashing, and screen switching.

Changeability information indicates whether a layout can be changed, such as enlarging of a screen.

Other information: Examples thereof include a page margin region and advertising data arranged in the region. The changeability information included in the other information is setting information indicating whether the original content can be modified, such as whether the layout can be changed. For example, the information indicates whether translation display, speech balloon enlargement, change in speech balloon shape, image change, reading aloud of a dialogue or an onomatopoeia, left-right reversal of an entire page are allowed. Whether the original content can be modified can be independently set with respect to each modification item. For example, it may be set such that translation display is allowed, but left-right reversal of an entire page is prohibited. It may be also set that scroll reproduction (scroll view) is allowed, but panel reproduction (panel view) is prohibited. Alternatively, the other information includes page information such as information regarding page turning (e.g., opening from left/opening from right), and a line feed direction (in a case of vertical writing).

The page information analysis section 10 analyzes the content images accumulated in the DB 11. Information acquired as a result of analysis is provided as the accompanying information. For example, the information regarding a page analysis result includes a layout of content elements (panels, drawings, character types in the drawings, speech balloons, dialogues, texts, tables, figures, etc.) in each page, a reading order of the content elements, character features (character name, character's gaze direction, character's size and position, etc.), a content of a text such as a dialogue, the position and amount (the number of letters) thereof, page/section/chapter, etc. break, or the like.

A known image analysis technique or text analysis technique is used to analyze and acquire the page information by the page information analysis section 10. For example, the position, size, and type of a content element such as a face, an animal, a building, an automobile, and other objects may be automatically detected based on a feature amount regarding image information thereof. The content element may be automatically detected based on machine learning. For example, the accuracy of detecting an outer edge of a panel or a speech balloon, and a determination threshold value for the validity of a region other than a rectangular region as a panel or a speech balloon is empirically set based on a sample comic for learning.

Alternatively, a text sentence (dialogue) within a speech balloon may be recognized by OCR, and a region surrounding the text sentence may be recognized as a dialogue region. Respective letters of a read-out dialogue are sorted according to a letter direction. For example, when the dialogue is written vertically, the letters are sorted from the top to the bottom of a line, and also from a right line to a left line.

A panel number or a dialogue number is determined according to a predetermined rule. For example, when the type of the content is a comic, the page number or the dialogue number is determined by sequentially scanning representative points (the center or gravity center of a panel or a speech balloon) of respective panels or respective speech balloons included in the content analysis information in a horizontal direction from a panel or a speech balloon at a right topmost position to a panel or a speech balloon at a left bottommost position.

The representative point of each panel is provided as a position (anchor point) at which gaze stops for a content element in each page. Content display is switched in units at the anchor point by scrolling or switching.

Alternatively, although not shown in the drawings, the page number or the dialogue number may be determined according to a rule for an author of the content.

Alternatively, the content analysis rule may not be only a prescribed rule according to the author or type of the content, but also a rule according to the author or type of the content learned by artificial intelligence.

For example, the rule is learned as follows. First, a correct rule is preliminarily prepared for each of a plurality of basic patterns. The page information analysis section 10 extracts a feature amount (thickness or length of a panel border line, etc.) for each of the plurality of basic patterns. The page information analysis section 10 estimates a reading order of panels assumed by a content creator based on the extracted feature amount. The page information analysis section 10 optimizes a parameter for estimating the reading order of panels by comparing the reading order estimated for each basic pattern and the correct rule. The page information analysis section 10 estimates a reading order of panels of a comic according to the optimized parameter.

For the simplicity of explanation, the original content is assumed to be a comic, and the original content image is assumed to be an image corresponding to each page of the comic. The comic unit a content composed of both pictures (irrespective of photographs or drawings) and dialogues.

The server 1 includes an image acquisition unit (not shown) that acquires an image (high-definition image) of an entire page corresponding to each page of the comic via a recording medium or a network, or acquires the image by reading the comic by a scanner, and the page information analysis section 10 automatically acquires the various accompanying information described above by analyzing the acquired image. The page information analysis section 10 may be also provided with a panel image generating function to generate a panel image by clipping a panel image for a panel view from the image of the entire page, or a panel image generation unit that generates a panel image by acquiring panel region information from the page information analysis section 10 and clipping a panel image for a panel view from the image of the entire page may be provided in the server.

The various accompanying information acquired by the page information analysis section 10 can be corrected by operating the operation section 16. Accompanying information may be also added by the operation section 16.

A digital comic in a file format including the high-definition image of the entire page corresponding to each page or the panel image acquired as described above, and the accompanying information accompanying the image is generated and stored in the DB 11. The present invention is not limited to a case in which the server 1 itself includes a digital comic generation section that generates a digital comic, and a digital comic generated by an external digital comic generation device may be stored in the DB 11 of the server 1.

Referring again to FIG. 1, the digital book viewer 2 is composed of a portable information terminal such as a smartphone and a tablet computer, and includes a display unit capable of reproducing an image, a communication unit, operation detection unit, a voice reproduction unit, an information processor, or the like.

To be more specific, the digital book viewer 2 includes a database (DB) 21, a display section 24, a content display control section 25, a voice reproduction section 26, an operation section 27, a loudspeaker 28, and an input-output section 29.

The display section 24 is a display unit composed of a display device such as an LCD. The operation section 27 is an operation detection unit composed of a touch panel or the like. The operation section 27 is preferably laminated on the display section 24, and can detect various operations on the display section 24 such as single tapping, double tapping, swiping, and pressing and holding.

The voice reproduction section 26 is a circuit that creates a voice from information regarding a voice (information regarding a reading voice and/or information regarding an accompanying voice) stored in a content file, and outputs the voice from the loudspeaker 28.

The input-output section 29 is a unit for inputting a content file output from the input-output section 17 of the server 1. The input-output section 17 and the input-output section 29 are typically a communication unit. The input-output sections may be also a writing/reading unit with respect to a recording medium readable by a computer.

The DB 21 stores information equivalent to that of the DB 11. That is, when the digital book viewer 2 requests transmission of a digital book to the server 1, the server 1 exports a content file in the DB 11 to the DB 21 via the input-output section 29, and stores the content file in the DB 21. The information in the DB 11 and the information in the DB 21 do not need to be completely the same as each other. The DB 11 is a library that stores various types of content images, e.g., content images of respective volumes of comics by different authors so as to respond to requests from various users. It is enough for the DB 21 to store only a content file relevant to a content that a user of the digital book viewer 2 wants to view.

The content display control section 25 performs display control of the content on the display section 24. The control will be described in detail later.

Figure 4:
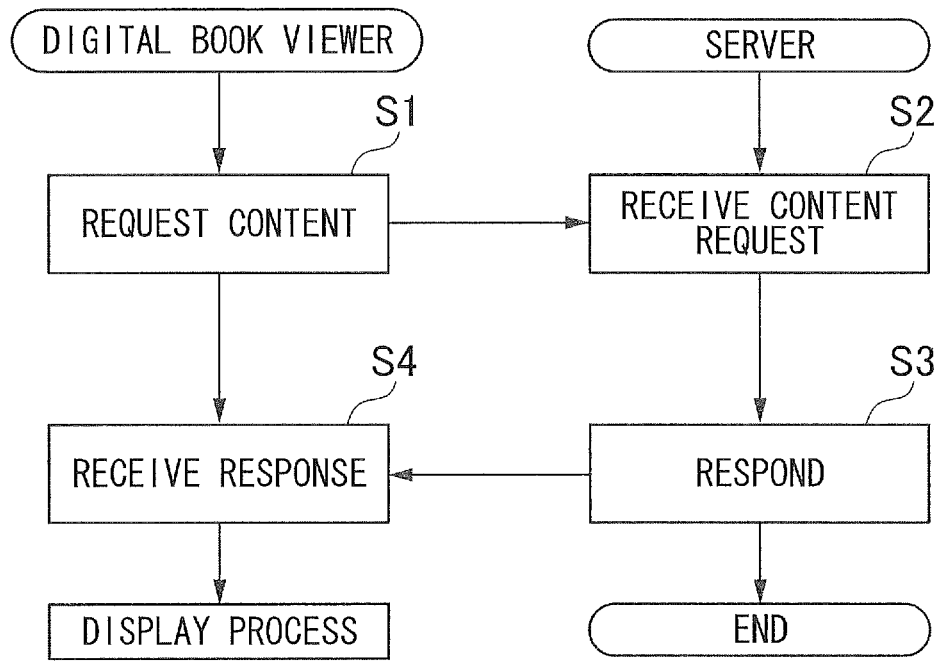
FIG. 4 is a flowchart of a delivery process.

FIG. 4 shows a flowchart of a delivery process executed between the server 1 and the digital book viewer 2. Steps S1 and S4 are executed by the digital book viewer 2, and steps S2 and S3 are executed by the server 1. A program that allows the server 1 and the digital book viewer 2 to respectively execute the process is stored in a memory medium (RAM, ROM, CDROM, etc.) readable by a computer provided in each of the server 1 and the digital book viewer 2.

In step S1, the digital book viewer 2 transmits a content request to the server 1 via the input-output section 29.

In step S2, the server 1 waits for a content request corresponding to a scroll view or a panel view, and when the server 1 receives the content request from the digital book viewer 2 via the input-output section 17, the process proceeds to step S3.

In step S3, the server 1 transmits a content file to the digital book viewer 2. That is, when there is a content request corresponding to the scroll view, the server 1 transmits a content file corresponding to the scroll view, and when there is a content request corresponding to the panel view, the server 1 transmits a content file corresponding to the panel view.

In step S4, the digital book viewer 2 receives the content file, and stores the content file in the DB 21. The process then proceeds to a display process described below. Content images may be transmitted in units of pages or units of panels, and as for accompanying information, only information corresponding to the units of the transmitted content images may be transmitted.

Figure 5:
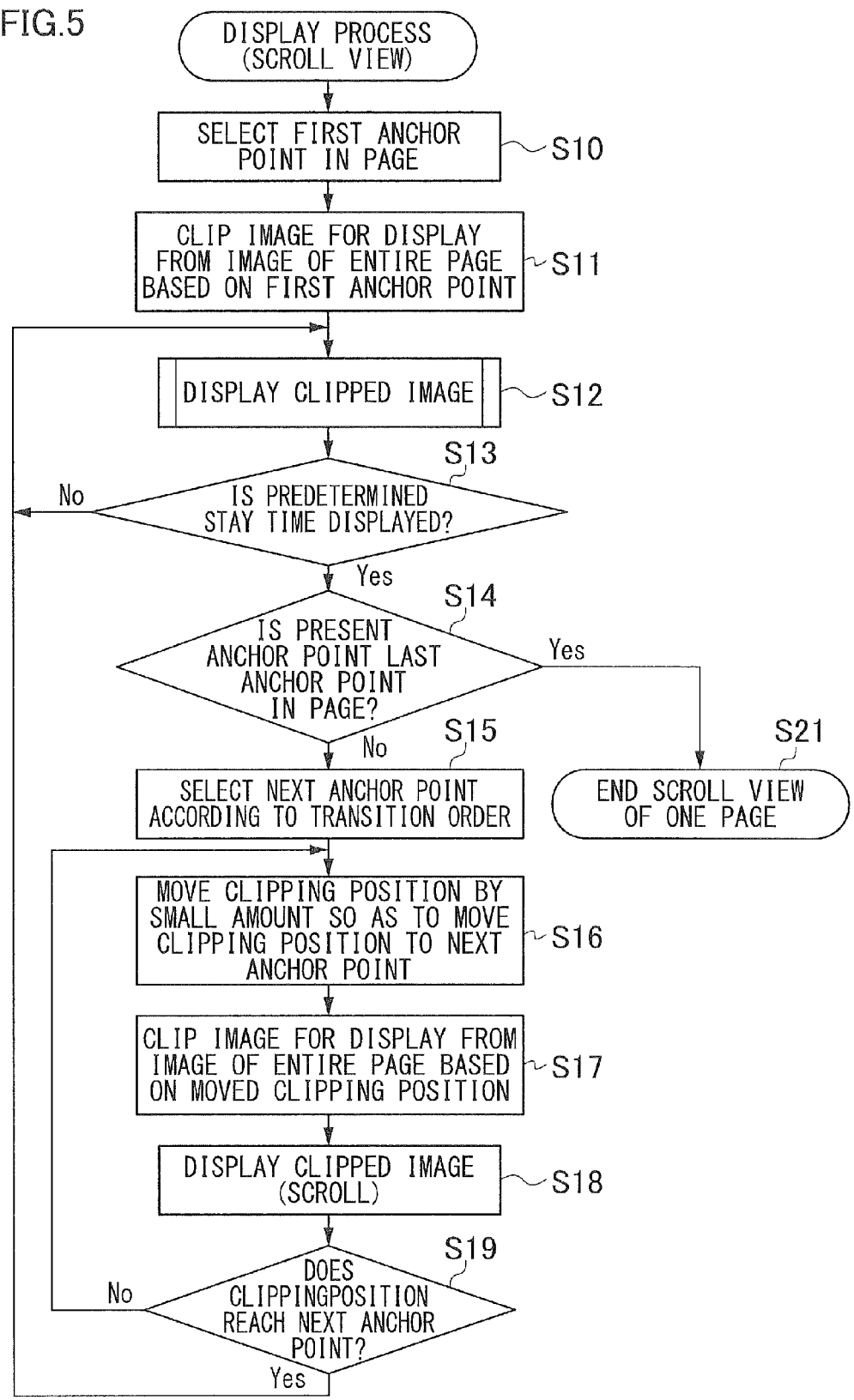
FIG. 5 is a flowchart of a display process (scroll view).
Figure 6:
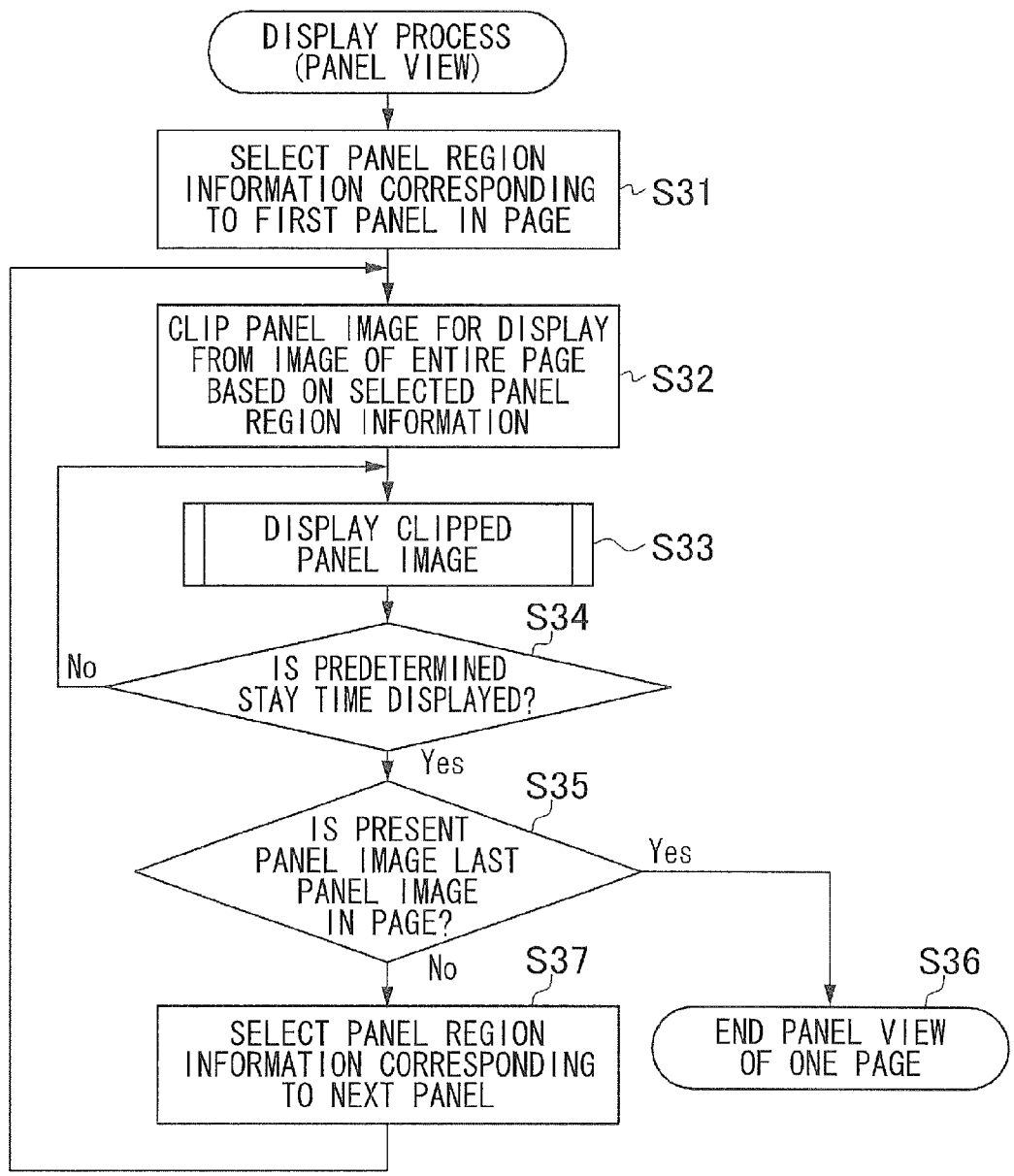
FIG. 6 is a flowchart of a display process (panel view).

FIG. 5 shows a flowchart of the display process (scroll view) executed by the digital book viewer 2. FIG. 6 shows a flowchart of the display process (panel view) executed by the digital book viewer 2. The process in FIG. 5 or 6 is executed according to selection from the operation section 27.

Referring to FIG. 5, in step S10, the content display control section 25 sets a first anchor point in a page with a specified content image as a current anchor point based on the content file in the DB 21.

In step S11, the content display control section 25 clips a detailed image for display from a schematic image of the entire page based on the current anchor point, and employs the detailed image as a current image. A detailed image of the content file may be read out and employed as a current image instead of clipping the detailed image.

In step S12, the content display control section 25 displays the detailed image on the display section 24.

In step S13, the content display control section 25 determines whether or not a stay time corresponding to the current anchor point has been passed based on the accompanying information of the content file in the DB 21. In a case of Yes, the process proceeds to step S14, and in a case of No, the process returns to step S12.

In step S14, the content display control section 25 determines whether or not the current anchor point is a last anchor point in the page. In a case of Yes, the process proceeds to step S21 to terminate display of the page. If there is a next page, steps from S10 are repeated for the page. In a case of No, the process proceeds to step S15.

In step S15, the content display control section 25 sets, as a tentative anchor point, a position incremented in predetermined units (e.g. dot by dot) from the current anchor point along a line segment connecting the current anchor point and a next anchor point. The increment is repeated by the number of loops from S16 to S19.

In steps S16 and S17, the content display control section 25 clips a detailed image for display from the image of the entire page based on the tentative anchor point, and employs the detailed image as a next detailed image. A detailed image of the content file may be also used instead of clipping the image.

In step S18, the content display control section 25 switches the detailed image corresponding to the present tentative anchor point to a detailed image corresponding to a next tentative anchor point, and displays the detailed image. As a result, the screen is scrolled in predetermined units.

In step S19, the content display control section 25 determines whether or not the tentative anchor point reaches the anchor point next to the current anchor point. In a case of Yes, the process returns to step S12 to employ the next anchor point as a new current anchor point, and display a detailed image corresponding to the current anchor point. In a case of No, the process returns to step S16 to continue scrolling in predetermined units.

Referring to FIG. 6, in step S31, the content display control section 25 sets a first panel as a current panel based on a panel order in a content image of a specified page.

In step S32, the content display control section 25 clips a detailed image corresponding to the current panel from the content image, and employs the detailed image as a current panel image. A detailed image of the content file may be also used instead of clipping the detailed image.

In step S33, the content display control section 25 displays the current panel image on the display section 24.

In step S34, the content display control section 25 determines whether or not a stay time corresponding to the current panel has been passed based on the accompanying information of the content file. In a case of Yes, the process proceeds to step S35, and in a case of No, the process returns to step S33.

In step S35, the content display control section 25 determines whether or not the current panel is a last panel in the page. In a case of Yes, the process proceeds to step S36 to terminate display of the page. If there is a next page, steps from S31 are repeated for the page. In a case of No, the process proceeds to step S37.

In step S37, the content display control section 25 sets a panel next to the current panel as a new current panel. The process then returns to step S32 to clip a detailed image corresponding to the current panel, or read out a detailed image, and employ the detailed image as a current panel image. The steps thereafter are the same as described above.

In step S12 or S33, the image may be switched according to an image feed instruction input to the operation section 27. The image is switched in units of anchor points (S12) or units of panels (S33). Also, the image is switched according to the anchor point order or the panel order. Since a user may desire irregular viewing such as skipping of pages, a content-image switching operation disregarding the order may be allowed.

Figure 7:
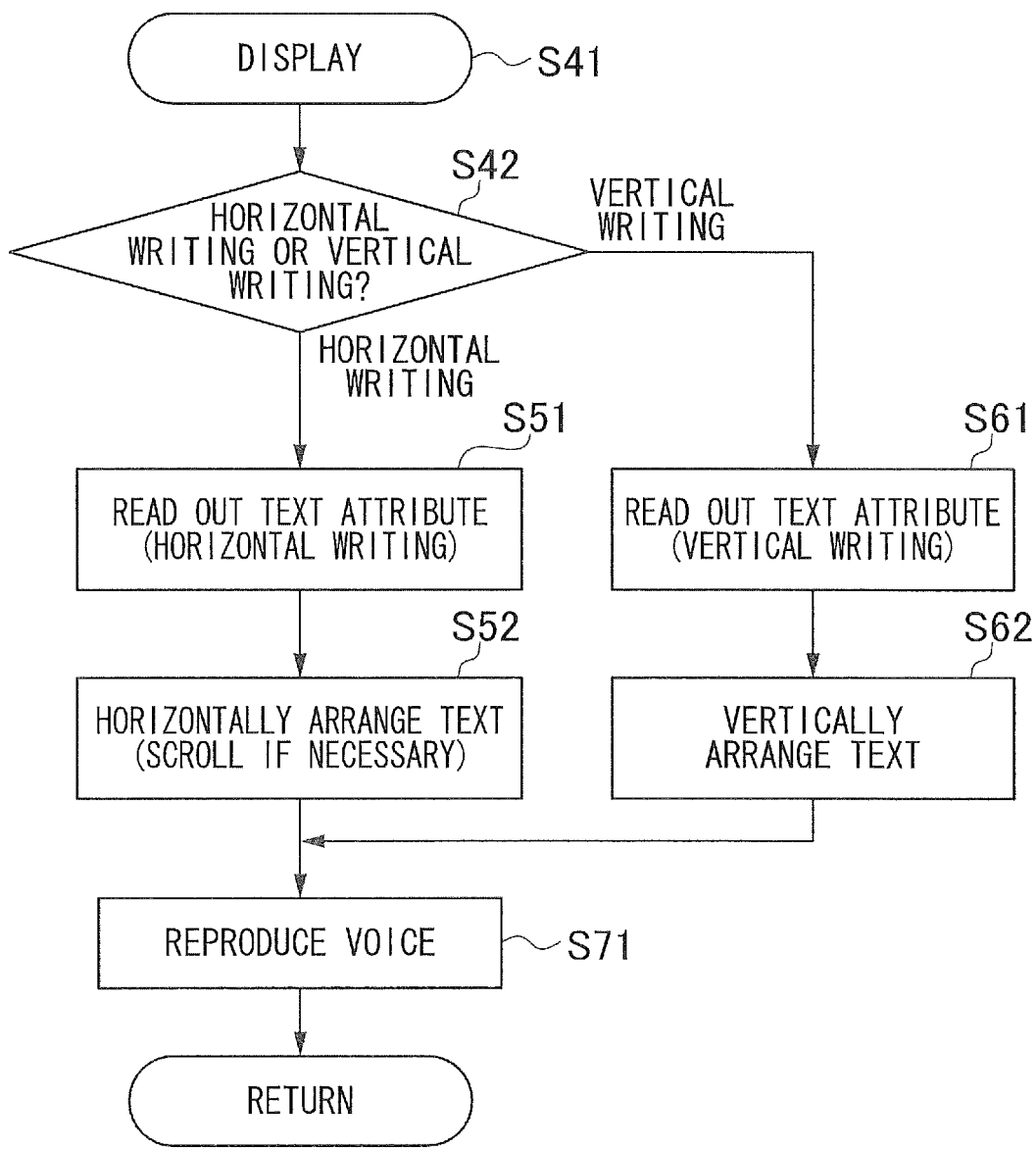
FIG. 7 is a flowchart of a dialogue process.

FIG. 7 shows a flowchart of a dialogue process executed by the digital book viewer 2. The process is executed in conjunction with step S12 or S33.

In step S41, the content display control section 25 starts displaying the content image based on the content file in the DB 21. The step is similar to step S12 or S33.

In step S42, the content display control section 25 determines whether "horizontal writing" is instructed or "vertical writing" is instructed as a dialogue display direction in a speech balloon. When there is an instruction of "horizontal writing", the process proceeds to step S51, and when there is an instruction of "vertical writing", the process proceeds to step S61.

In step S51, the content display control section 25 reads out positional information of a speech balloon corresponding to an image region specified to be displayed, a text attribute (size, font, letter spacing, line spacing, the number of lines, etc.) included in text information of a horizontal dialogue (translated text) corresponding to the speech balloon, and information of a character as a speaker of the speech balloon.

Figure 8:
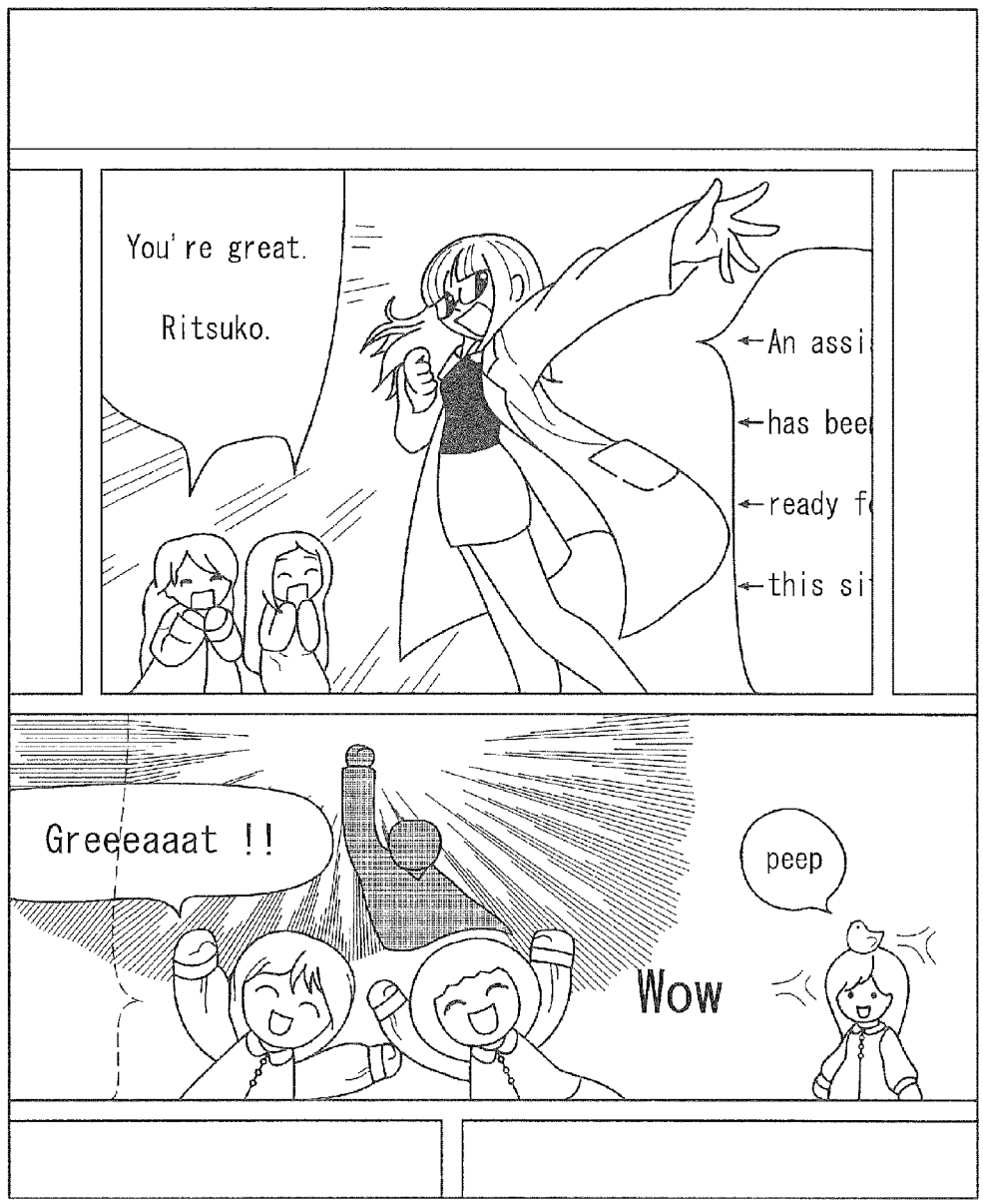
FIG. 8 is a view illustrating one example of display of text information (horizontal) in a speech balloon.

In step S52, the content display control section 25 horizontally arranges the text information of the dialogue according to the text attribute within the speech balloon based on the positional information of the speech balloon. The content display control section 25 determines whether or not the text information is fitted when arranged horizontally according to the text attribute, and when determining that the text information is not fitted, the content display control section 25 starts scrolling the text information within the speech balloon. Scrolling may be performed in any manner. For example, as shown in FIG. 8, letters of the text information may be arranged in one line or a plurality of lines, and sequentially scrolled in a line direction from a first letter to a last letter of each line. A scrolling direction depends on the type of language. Since English is read from left to right, the scrolling direction is left. When scrolling of all the letters is finished, scrolling may be repeated from the first letter.

In step S61, the content display control section 25 reads out positional information of a speech balloon corresponding to an image region specified to be displayed, text information and a text attribute of a vertical dialogue (original text) corresponding to the speech balloon, and information of a character as a speaker of the speech balloon.

Figure 9:
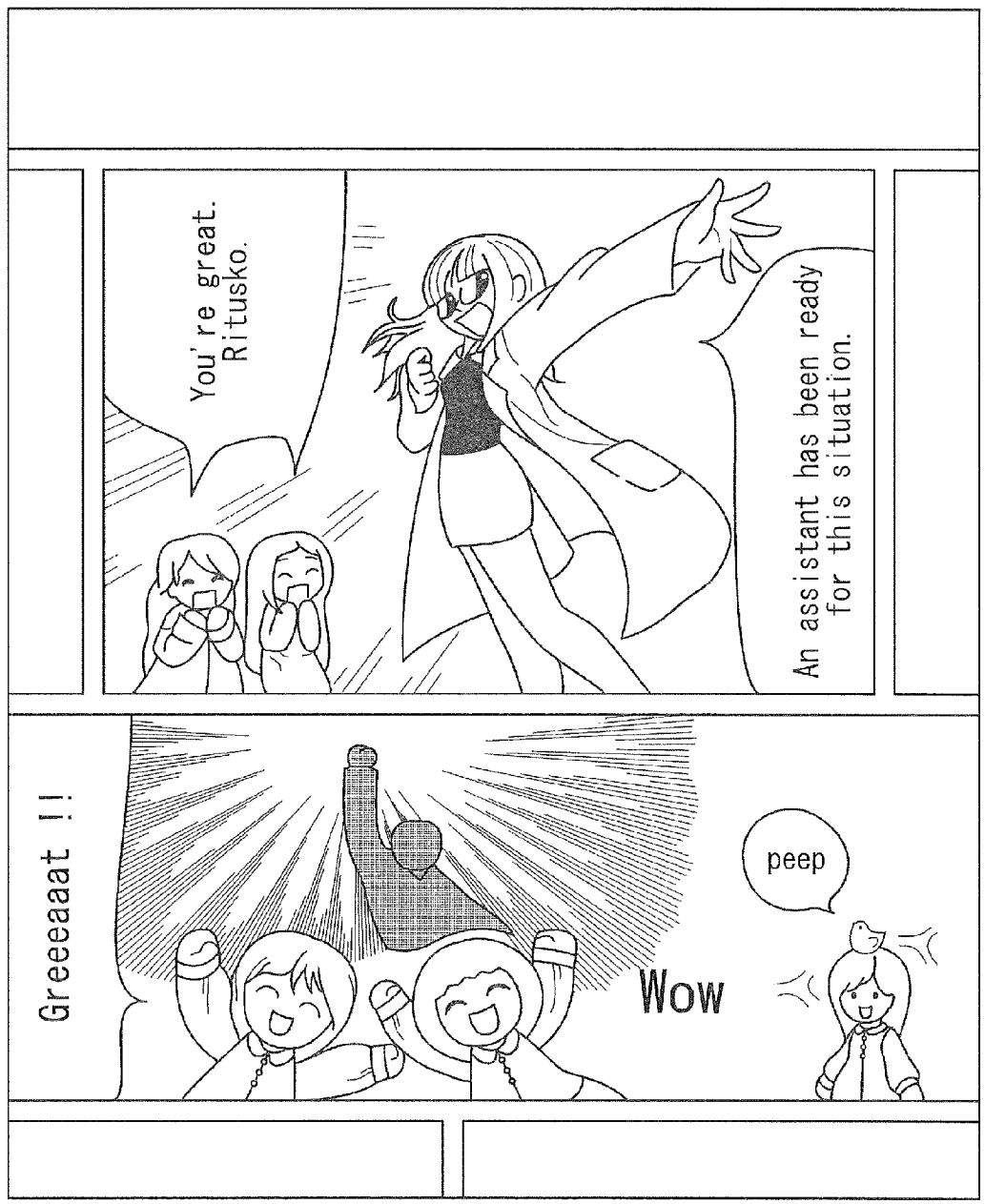
FIG. 9 is a view illustrating one example of display of text information (vertical) in a speech balloon.

In step S62, the content display control section 25 vertically arranges the text information of the dialogue according to the text attribute within the speech balloon based on the positional information of the speech balloon (see FIG. 9).

In step S71, the voice reproduction section 26 reproduces a voice based on information regarding a voice.

First, the voice reproduction section 26 determines a dialogue corresponding to the detailed image presently displayed by the content display control section 25, a voice corresponding to the dialogue, and an accompanying voice corresponding to a panel to which the dialogue belongs, and acquires information regarding voice reproduction (text information, attribute information of a character, attribute information of automatic reading aloud, onomatopoeia) from the accompanying information.

FIG. 10 shows one example of the information regarding voice reproduction corresponding to the displayed detailed image (anchor point 3).

The voice reproduction section 26 identifies an attribute of a dialogue voice from the information regarding voice reproduction, and outputs a voice corresponding to the attribute from the loudspeaker 28. For example, when the attribute indicates that the age of a dialogue speaker is 15, and the sex of the dialogue speaker is female, the voice reproduction section 26 synthesizes a dialogue voice with an attribute of a preset early-teen female voice, and outputs the dialogue voice from the loudspeaker 28.

When the dialogue voice has no attribute due to such reasons that a speaker is not important (appears only one time, etc.), a speaker has no personality, and the like, the dialogue voice is synthesized with a default attribute.

Also, when there is no attribute regarding a reading volume or a reading speed, the dialogue voice is synthesized based on an attribute of a speech balloon in which the corresponding dialogue is arranged, or an attribute of the dialogue.

Figure 3A:
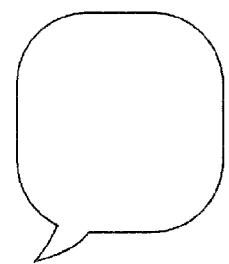
FIG. 3A is a view illustrating one example of information regarding the shape of a speech balloon (normal).
Figure 3B:
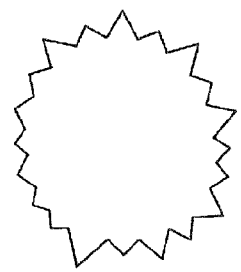
FIG. 3B is a view illustrating one example of information regarding the shape of a speech balloon (loud voice).
Figure 3C:
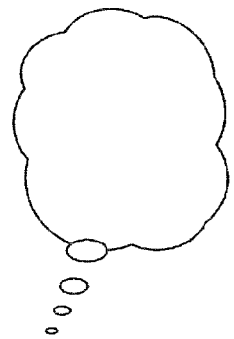
FIG. 3C is a view illustrating one example of information regarding the shape of a speech balloon (imagination).
Figure 3D:
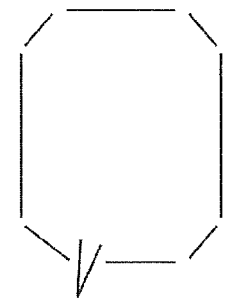
FIG. 3D is a view illustrating one example of information regarding the shape of a speech balloon (inanimate object).

For example, when the type of the speech balloon represents a dialogue in a loud voice as shown in FIG. 3B, the voice reproduction section 26 sets the reading volume of the dialogue to "high". Alternatively, when the type of the speech balloon represents a dialogue indicating imagination or remembrance as shown in FIG. 3C, the voice reproduction section 26 sets the reading volume of the dialogue to "low". Alternatively, when the type of the speech balloon is other than those in FIGS. 3B and 3C, the voice reproduction section 26 sets the reading volume of the dialogue to "medium".

Alternatively, when letters of the dialogue include an emphasized letter or a mark "!", the voice reproduction section 26 sets the reading volume of the dialogue to "high".

Alternatively, when the letter spacing of the dialogue is "large", the voice reproduction section 26 sets the reading speed of the dialogue to "slow", and when the letter spacing of the dialogue is "small", the voice reproduction section 26 sets the reading speed of the dialogue to "quick".

Here, the voice reproduction section 26 creates a voice in the same language as the language of the dialogue arranged in the speech balloon. However, if a different language from the language of the speech balloon is specified by the operation section 27, the voice reproduction section 26 creates a voice in the language.

Starting/ending of display of the dialogue in the speech balloon is synchronized with starting/ending of reading aloud of the dialogue in the speech balloon. For example, if the reading order of speech balloons is included in the information regarding a speech balloon, dialogues in the speech balloons are read aloud according to the order. At this point, a visual effect may be applied to dialogue letters in synchronization with reproduction of the dialogue being read aloud. For example, as the visual effect on the dialogue letters, the individual letters of a dialogue being read aloud may be highlighted, or decorated with underline, dot, and color, only a dialogue portion being read aloud may be shown by scrolling, the individual letters of a dialogue not being read aloud may be grayed out, or a dialogue which has been already read aloud may be faded out.

When the start/end timings of an accompanying voice are specified in the information regarding an accompanying voice, the accompanying voice is reproduced according to the timings. When the timings are not specified, starting/ending of reading aloud of the dialogue in the speech balloon are also synchronized with starting/ending of the accompanying voice in a panel to which the speech balloon belongs. For example, when there are letters "Wow" in the background, a corresponding cheer is reproduced from the starting to the ending of display of a detailed image in which the letters are included.

When the same accompanying voice is arranged over a plurality of panels, the voice reproduction section 26 continuously reproduces the accompanying voice by, for example, repeating the accompanying voice from the starting to the ending of display of the panels.

As described above, when the content file of the present invention is provided to the digital book viewer 2, the digital book viewer 2 can arrange a dialogue and perform scrolling according to the language of the dialogue, and can reproduce a voice of the dialogue, an onomatopoeia and a sound effect.

Second Embodiment

Figure 11:
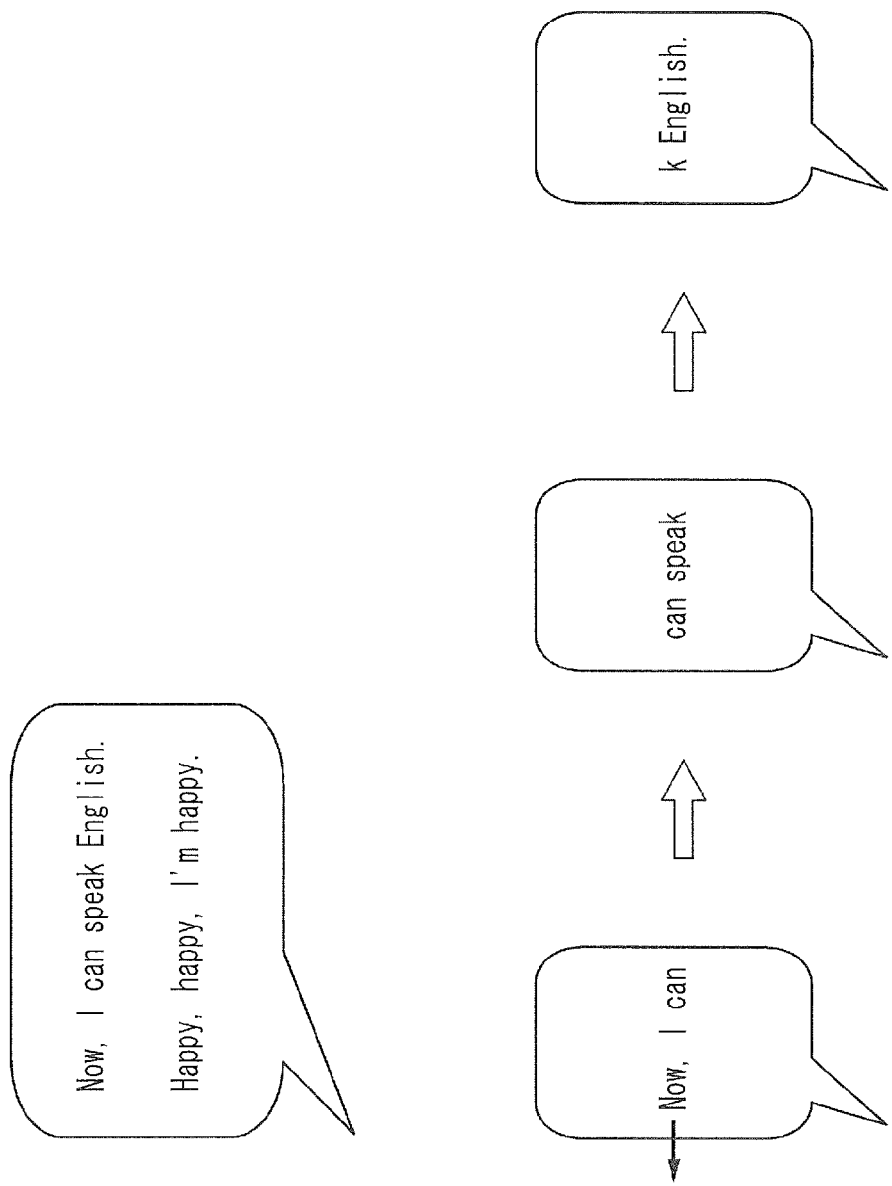
FIG. 11 is a view illustrating another example (scrolling of one line) of display of text information in a speech balloon.
Figure 14:
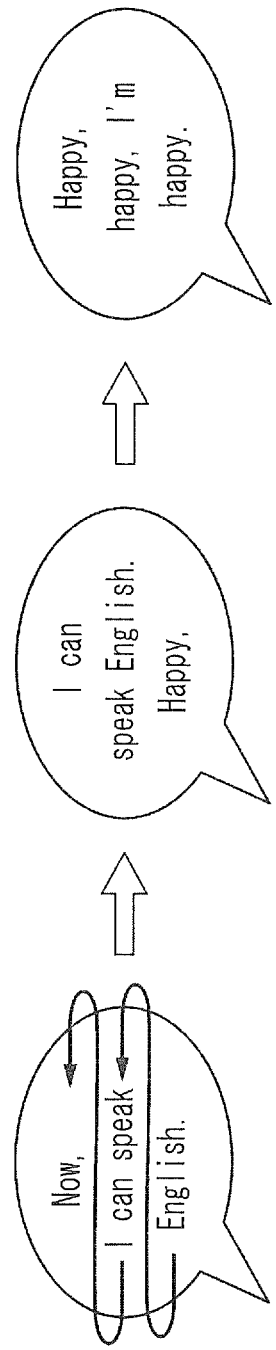
FIG. 14 is a view illustrating another example (spiral scrolling according to the shape of a speech balloon) of display of text information in a speech balloon.

Various methods for scrolling text information in a speech balloon can be employed as the scrolling method in step S52 of the display process according to the first embodiment. For example, as shown in FIG. 11, the text information is scrolled in one line. Alternatively, as shown in FIG. 12, a text in a first line is scrolled to the left, and scrolling is then performed in a spiral shape such that text information in a second line or below is moved forward into a space generated in the first line by scrolling. Alternatively, as shown in FIG. 13, respective lines are scrolled at the same time. Alternatively, as shown in FIG. 14, scrolling is performed in a spiral shape according to the shape of the speech balloon.

REFERENCE SIGNS LIST

1 Server
2 Digital book viewer

The invention claimed is:
1. A viewer device for a digital comic comprising:
an information acquisition unit that acquires a digital comic in a file format for a digital comic viewed on a viewer device, the file format including
a high-definition image of an entire page for each page of a comic,
speech balloon information including information of a speech balloon region that indicates a region of a speech balloon in which a dialogue of a character of the comic is placed within the image,
first text information indicating a dialogue within each speech balloon, the first text information being correlated with each speech balloon, and
first display control information including positional information and a transition order of a predetermined anchor point so as to enable the image of the entire page to be viewed on a monitor of the viewer device in a scroll view;
a display unit;

an image display control unit that scroll-reproduces or panel-reproduces the image of each page on a screen of the display unit based on the display control information of the acquired digital comic;

a letter display control unit that displays a letter corresponding to the text information of the acquired digital comic instead of an original letter within the speech balloon region in the image displayed on the screen of the display unit based on the speech balloon information and the text information of the acquired digital comic; and a voice reproduction section that synthesizes a voice for reading the letter corresponding to the text information based on an attribute of the character, an attribute of the speech balloon, or an attribute of the dialogue, and outputs the voice.

2. The viewer device for a digital comic according to claim 1, wherein the speech balloon information includes at least one of positional information of a speech balloon pointer, and a type of a speech balloon line.

3. The viewer device for a digital comic according to claim 1, wherein the file format includes existence region information indicating a region of a character within the image of the entire page.

4. The viewer device for a digital comic according to claim 1, wherein the file format includes second text information indicating an onomatopoeia or a letter in a region other than the speech balloon region, the second text information being correlated with each panel.

5. The viewer device for a digital comic according to claim 4, wherein the second text information includes a translated text obtained by translating the onomatopoeia or the letter in an original text in the region other than the speech balloon region into a predetermined language.

6. The viewer device for a digital comic according to claim 4, wherein the second text information includes attribute information of the onomatopoeia or the letter in the region other than the speech balloon region.

7. The viewer device for a digital comic according to claim 4, wherein the second text information includes second accompanying information of at least one of the number of phonations of the onomatopoeia, a phonation starting time, a volume, and a reading speed of the onomatopoeia or the letter.

8. The viewer device for a digital comic according to claim 1, wherein the first text information includes a translated text obtained by translating the dialogue in an original text within the speech balloon into a predetermined language.

9. The viewer device for a digital comic according to claim 8, wherein the file format includes information regarding a language of the translated text.

10. The viewer device for a digital comic according to claim 1, wherein the first text information includes an attribute of a character for the dialogue within each speech balloon.

11. The viewer device for a digital comic according to claim 1, wherein the first text information includes attribute information of a letter of the dialogue within each speech balloon.

12. The viewer device for a digital comic according to claim 1, wherein the first text information includes first accompanying information of at least one of a volume and a reading speed of a voice for the dialogue within each speech balloon.

13. The viewer device for a digital comic according to claim 1, wherein the first display control information includes a scenario of screen transition including a stopping time at each anchor point in the scroll view.

14. The viewer device for a digital comic according to claim 1, wherein the file format includes tag information including a comic title, which episode, which volume, an author, and a publisher.

15. A server delivering a digital comic in a file format according to claim 1 according to a request from the viewer device.

16. A viewer device for a digital comic comprising:

an information acquisition unit that acquires a digital comic in a file format for a digital comic viewed on a viewer device, the file format including a panel image of each panel of a comic;

speech balloon information including information of a speech balloon region that indicates a region of a speech balloon in which a dialogue of a character of the comic is placed within the panel image;

first text information indicating a dialogue within each speech balloon, the first text information being correlated with each speech balloon; and second display control information including a reproduction order of respective panel images and an image size of the panel image so as to enable the panel image to be viewed on a monitor of the viewer device in a panel view;

a display unit;

an image display control unit that scroll-reproduces or panel-reproduces the image of each panel on a screen of the display unit based on the display control information of the acquired digital comic;

a letter display control unit that displays a letter corresponding to the text information of the acquired digital comic instead of an original letter within the speech balloon region in the image displayed on the screen of the display unit based on the speech balloon information and the text information of the acquired digital comic; and a voice reproduction section that synthesizes a voice for reading the letter corresponding to the text information based on an attribute of the character, an attribute of the speech balloon, or an attribute of the dialogue, and outputs the voice.

17. The viewer device for a digital comic according to claim 16, wherein the file format includes existence region information indicating a region of a character within the panel image.

18. The viewer device for a digital comic according to claim 16, wherein the second display control information includes a scenario of screen transition including a stopping time at each panel image in the panel view.

19. A viewer device for a digital comic comprising:

an information acquisition unit that acquires a digital comic in a file format for a digital comic viewed on a viewer device, the file format including a high-definition image of an entire page for each page of a comic;

speech balloon information including information of a speech balloon region that indicates a region of a speech balloon in which a dialogue of a character of the comic is placed within the image;

first text information indicating a dialogue within each speech balloon, the first text information being correlated with each speech balloon;

first display control information including positional information and a transition order of a predetermined anchor point so as to enable the image of the entire page to be viewed on a monitor of the viewer device in a scroll view; and second display control information including panel region information that indicates a region of each panel image within the image of the entire page, a reproduction order of respective panel images, and an image size of the panel image so as to enable the panel image of each panel within the image of the entire page to be viewed on the monitor of the viewer device in a panel view;

a display unit;

an image display control unit that scroll-reproduces or panel-reproduces the image of each page or each panel on a screen of the display unit based on the display control information of the acquired digital comic;

a letter display control unit that displays a letter corresponding to the text information of the acquired digital comic instead of an original letter within the speech balloon region in the image displayed on the screen of the display unit based on the speech balloon information and the text information of the acquired digital comic; and a voice reproduction section that synthesizes a voice for reading the letter corresponding to the text information based on an attribute of the character, an attribute of the speech balloon, or an attribute of the dialogue, and outputs the voice.

20. A digital comic generation device comprising:

an image acquisition unit that acquires a high-definition image of an entire page for each page of a comic;

a page info, illation analysis unit that analyzes the acquired image, and thereby acquires speech balloon information including information of a speech balloon region that indicates a region of a speech balloon in which a dialogue of a character of the comic is placed within the image, first text information indicating a dialogue within each speech balloon, the first text information being correlated with each speech balloon, and first display control information including positional information and a transition order of a predetermined anchor point so as to enable the image of the entire page to be viewed on a monitor of a viewer device in a scroll view;

a digital comic generation unit that generates a digital comic in a file format including the acquired high-definition image of the entire page, and the speech balloon information, the first text information, and the first display control information relevant to the image; and a voice reproduction unit that synthesizes a voice for reading a letter corresponding to the first text information based on an attribute of the character, an attribute of the speech balloon, or an attribute of the dialogue, and outputs the voice.

21. A digital comic generation device comprising:

an image acquisition unit that acquires a high-definition image of an entire page for each page of a comic;

a page information analysis unit that analyzes the acquired image, and thereby acquires speech balloon information including information of a speech balloon region that indicates a region of a speech balloon in which a dialogue of a character of the comic is placed within the image, first text information indicating a dialogue within each speech balloon, the first text information being correlated with each speech balloon, and first display control information including positional information and a transition order of a predetermined anchor point so as to enable the image of the entire page to be viewed on a monitor of the viewer device in a scroll view;

a digital comic generation unit that generates a digital comic in a file format including the high-definition image of the entire page acquired by the image acquisition unit, and the speech balloon information, the first text information, and the first display control information acquired by the page information analysis unit; and a voice reproduction unit that synthesizes a voice for reading a letter corresponding to the first text information based on an attribute of the character, an attribute of the speech balloon, or an attribute of the dialogue, and outputs the voice.

22. A digital comic generation device comprising:

an image acquisition unit that acquires a high-definition image of an entire page for each page of a comic;

a page information analysis unit that analyzes the acquired image, and thereby acquires panel region information indicating a region of a panel image of each panel within the image of the entire page, speech balloon information including information of a speech balloon region that indicates a region of a speech balloon in which a dialogue of a character of the comic is placed within the panel image, first text information indicating a dialogue within each speech balloon, the first text information being correlated with each speech balloon, and second display control information including a reproduction order of respective panel images and an image size of the panel image so as to enable the panel image to be viewed on a monitor of a viewer device in a panel view;

a panel image generation unit that generates a panel image by clipping a panel image from the high-definition image based on the panel region information acquired by the page information analysis unit;

a digital comic generation unit that generates a digital comic in a file format including the panel image generated by the panel image generation unit, and the speech balloon information, the first text information, and the second display control information acquired by the page information analysis unit; and a voice reproduction unit that synthesizes a voice for reading a letter corresponding to the first text information based on an attribute of the character, an attribute of the speech balloon, or an attribute of the dialogue, and outputs the voice.

23. A digital comic generation device comprising:

an image acquisition unit that acquires a high-definition image of an entire page for each page of a comic;

a page information analysis unit that analyzes the acquired image, and thereby acquires panel region information indicating a region of a panel image of each panel within the image of the entire page, speech balloon information including information of a speech balloon region that indicates a region of a speech balloon in which a dialogue of a character of the comic is placed within the image, first text information indicating a dialogue within each speech balloon, the first text information being correlated with each speech balloon, first display control information including positional information and a transition order of a predetermined anchor point so as to enable the image of the entire page to be viewed on a monitor of a viewer device in a scroll view, and second display control information including a reproduction order of respective panel images and an image size of the panel image so as to enable the panel image to be viewed on the monitor of the viewer device in a panel view;

a digital comic generation unit that generates a digital comic in a file format including the high-definition image of the entire page acquired by the image acquisition unit, and the panel region information, the speech balloon information, the first text information, the first display control information, and the second display control information acquired by the page information analysis unit; and a voice reproduction unit that synthesizes a voice for reading a letter corresponding to the first text information based on an attribute of the character, an attribute of the speech balloon, or an attribute of the dialogue, and outputs the voice.

\* \* \* \* \*